(12) United States Patent
Shimmei et al.

(10) Patent No.: US 11,444,519 B2
(45) Date of Patent: Sep. 13, 2022

(54) RESIN MOLDING METHOD

(71) Applicant: TOYOTA JIDOSHA KABUSHIKI KAISHA, Toyota (JP)

(72) Inventors: Akihide Shimmei, Toyota (JP); Yoshiaki Tokunaga, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 593 days.

(21) Appl. No.: 16/566,388

(22) Filed: Sep. 10, 2019

(65) Prior Publication Data

US 2020/0099281 A1    Mar. 26, 2020

(30) Foreign Application Priority Data

Sep. 20, 2018 (JP) .............................. JP2018-176178

(51) Int. Cl.
| | |
|---|---|
| *H02K 15/12* | (2006.01) |
| *H02K 3/38* | (2006.01) |
| *H02K 3/50* | (2006.01) |
| *H02K 15/00* | (2006.01) |
| *B29C 45/14* | (2006.01) |
| *B29C 45/72* | (2006.01) |
| *H02K 15/10* | (2006.01) |
| *B29K 101/10* | (2006.01) |
| *B29L 31/00* | (2006.01) |

(52) U.S. Cl.
CPC ....... *H02K 15/12* (2013.01); *B29C 45/14639* (2013.01); *B29C 45/7207* (2013.01); *H02K 3/38* (2013.01); *H02K 3/50* (2013.01); *H02K 15/0062* (2013.01); *H02K 15/105* (2013.01); *B29K 2101/10* (2013.01); *B29L 2031/7498* (2013.01)

(58) Field of Classification Search
CPC ........ H02K 3/38; H02K 15/10; H02K 15/105; H02K 15/12; H02K 15/125
See application file for complete search history.

(56) References Cited

U.S. PATENT DOCUMENTS

| | | | |
|---|---|---|---|
| 2015/0210804 A1 | 7/2015 | Mueller-Cristadoro et al. | |
| 2016/0165879 A1* | 6/2016 | Elliott ..................... | C12N 1/04 252/400.2 |
| 2016/0190891 A1* | 6/2016 | Masugi .................. | H02K 15/12 310/201 |

FOREIGN PATENT DOCUMENTS

| | | | |
|---|---|---|---|
| JP | 2002-343528 A | | 11/2002 |
| JP | 2002343528 A | * | 11/2002 |
| JP | 2005-279205 A | | 10/2005 |
| JP | 2007-097238 A | | 4/2007 |
| JP | 2007-260731 A | | 10/2007 |
| JP | 2012-013708 A | | 1/2012 |

(Continued)

*Primary Examiner* — Quyen P Leung
*Assistant Examiner* — Minki Chang
(74) *Attorney, Agent, or Firm* — Oliff PLC (57) ABSTRACT

A resin molding method includes a first step of supplying electricity to and heating a stator coil via a stator terminal in a state that the stator terminal clamped; and a second step of molding an insulating resin at a coil end of the heated stator coil. The first step places the stator terminal on a conducting terminal block in such a state that clamping of the stator terminal by the conducting terminal block and a terminal holding member is released, before supplying electricity to the stator coil, and lifts up and down the conducting terminal block, such that the portion of the stator terminal becomes within a predetermined range.

3 Claims, 6 Drawing Sheets

(56) References Cited

FOREIGN PATENT DOCUMENTS

| JP | 2015-136242 | A |   | 7/2015  |             |           |
|----|-------------|---|---|---------|-------------|-----------|
| JP | 2015-533887 | A |   | 11/2015 |             |           |
| JP | 2016-197972 | A |   | 11/2016 |             |           |
| JP | 2016197972  | A | * | 11/2016 |             |           |
| WO | WO-2009142129 | A1 | * | 11/2009 | ............ | H02K 15/12 |

* cited by examiner

RESIN MOLDING METHOD

CROSS-REFERENCE TO RELATED APPLICATIONS

The present disclosure claims priority to Japanese Patent Application No. 2018-176178 filed Sep. 20, 2018, which is incorporated herein by reference in its entirety including specification, drawings and claims.

TECHNICAL FIELD

The present disclosure relates to a resin molding method and more specifically to a resin molding method performed to mold an insulating resin at a coil end of a stator coil mounted to a stator core.

BACKGROUND

A proposed resin molding method applies a coil fixing agent on a stator coil, and places and heats the stator coil with the coil fixing agent applied thereon in a heating furnace to cure and mold the coil fixing agent (as described in, for example, JP 2015-136242A). This proposed method supplies electricity to and heats the stator coil, before placing the coil fixing agent into the heating furnace. This configuration quickly cures the coil fixing agent and improves the production efficiency.

SUMMARY

When there is a variation in position of a stator terminal that is connected the stator coil and that is to be assembled to another device (for example, transaxle) however, the above resin molding method may make it difficult to assemble the stator terminal to another device. A technique employable to avoid such a problem may adjust the position of a stator terminal by using a dedicated device after molding the resin on the stator coil and subsequently assemble the stator terminal to another device. This technique, however, needs time to provide a dedicated device for adjustment of the position of the stator terminal after molding the resin on the stator coil and to set a stator in the dedicated device. This accordingly increases a required time period from the time when the stator coil is mounted to a stator core to the time when the stator terminal is assembled to another device.

A main object of a resin molding method of the preset disclosure is to suppress an increase in required time period from the time when a stator coil is mounted to a stator core to the time when stator terminals are assembled to another device.

In order to achieve the main object described above, the present disclosure is implemented by aspects of a resin molding method described above.

According to one aspect of the present disclosure, there is provided a resin molding method of molding an insulating resin to cover a coil end of a stator coil that is mounted to a stator core. The resin molding method includes a first step of supplying electricity to and heating the stator coil via a stator terminal in a state that the stator terminal is clamped, by using a conducting terminal block configured to be electrically conducted and to be lifted up and down and provided to mount thereon the stator terminal that is connected with the stator core and that is placed outside of the stator core, as well as a terminal holding member configured to be lifted up and down and to work in combination with the conducting terminal block to clamp the stator terminal; and a second step of covering the coil end of the heated stator coil with the insulating resin, while molding the insulating resin. The first step places the stator terminal on the conducting terminal block in such a state that clamping of the stator terminal by the conducting terminal block and the terminal holding member is released, before supplying electricity to and heating the stator coil via the stator terminal in the state that the stator terminal is clamped, and moves the conducting terminal block either upward or downward, such that position of the stator terminal becomes within a predetermined range.

The resin molding method according to the above aspect of the present disclosure uses the conducting terminal block that is configured to be electrically conducted, and to be lifted up and down and that is provided to mount thereon the stator terminal connected with the stator core and placed outside of the stator core, as well as the terminal holding member that is configured to be lifted up and down and that works in combination with the conducting terminal block to clamp the stator terminal, so as to supply electricity to and heat the stator coil via the stator terminal in the state that the stator terminal is clamped. The resin molding method then covers the coil end of the heated stator coil with the insulating resin, while molding the insulating resin. The resin molding method places the stator terminal on the conducting terminal block in such a state that clamping of the stator terminal by the conducting terminal block and the terminal holding member is released, before supplying electricity to and heating the stator coil via the stator terminal in the state that the stator terminal is clamped, and moves the conducting terminal block either upward or downward, such that the position of the stator terminal becomes within a predetermined range. The "predetermined range" herein denotes a preset range of the position of the stator terminal where the stator terminal is successfully mountable to another device. The conducting terminal block is moved either upward or downward by taking into account the fact that the stator terminal is moved inward or outward in a radial direction of the stator core by moving the conducting terminal block upward or downward. This configuration enables adjustment of the position of the stator terminal and supply of electricity to the stator coil to be performed in an identical apparatus as a series of processes. This configuration suppresses an increase in required time period from the time when the stator coil is mounted to the stator core to the time when the stator terminal is assembled to another device, compared with a configuration of molding an insulating resin to cover the stator coil and subsequently placing the stator in a different dedicated device to adjust the position of the stator terminal.

DESCRIPTION OF EMBODIMENTS

The following describes some aspects of the present disclosure with reference to an embodiment.

Figure 1:
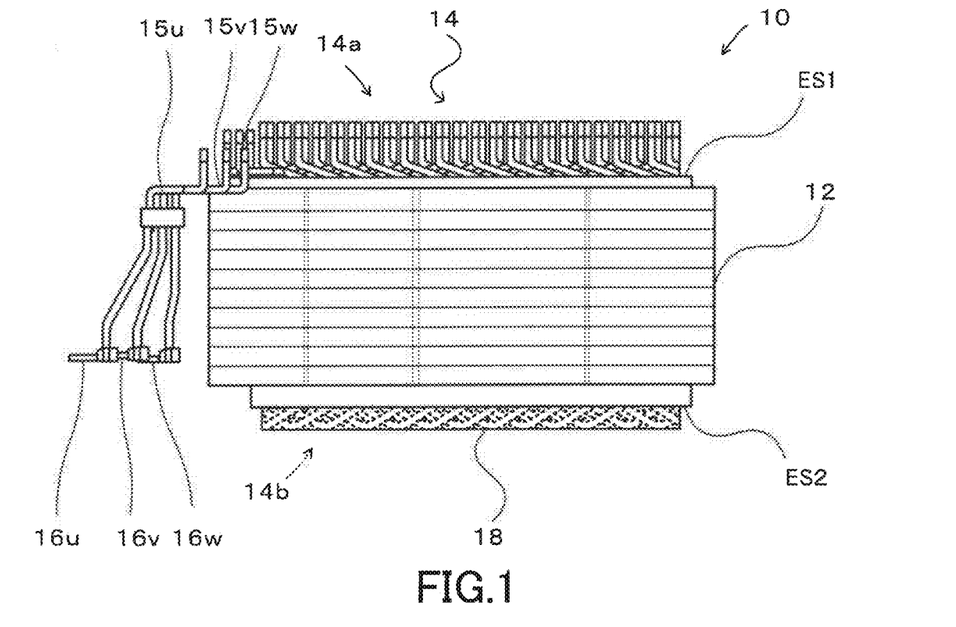
FIG. 1 is a diagram illustrating one exemplary configuration of a stator with an insulating resin molded by a resin molding method according to one embodiment of the present disclosure.

FIG. 1 is a diagram illustrating one exemplary configuration of a stator 10 with an insulating resin 18 molded by a resin molding method according to one embodiment of the present disclosure. The stator 10 is combined with a rotor (not shown) to provide a three-phase AC generator motor and is used for a motor or a generator for driving mounted on, for example, an electric vehicle or a hybrid vehicle. The stator 10 includes stator core 12 and a three-phase (U phase, V phase and W phase) stator coil 14.

The stator core 12 is configured by stacking a plurality of non-oriented magnetic steel sheets, which are formed in a ring shape by for example, pressing. The stator core 12 includes a plurality of teeth (not shown) arranged at intervals in a circumferential direction to be protruded inward in a radial direction, and a plurality of core slots (not shown) formed between respective adjacent teeth.

The three-phase stator coil 14 is wound on the plurality of teeth of the stator core 12 by concentrated winding or by distributed winding, such that two coil ends 14a and 14b are protruded outward from respective end faces ES1 and ES2 in an axial direction of the stator core 12. Three power lines 15u, 15v and 15w respectively for the U phase, the V phase and the W phase are pulled out from the coil end 14a to be located on the outer side of the stator core 12 and to be connected with stator terminals 16u, 16v and 16w. The stator terminals 16u, 16v and 16w are placed at a lower position than the upper side end face ES1.

The coil end 14b is covered by the insulating resin 18 that is formed from a thermoplastic resin of the high tis insulating property, for the purpose of protection and fixation.

Figure 2:
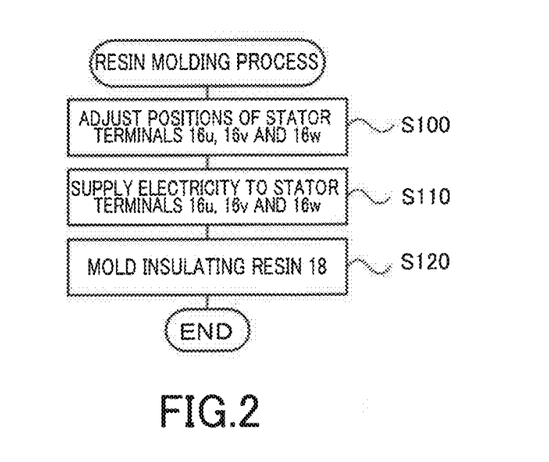
FIG. 2 is a process chart showing a resin molding process performed to mold the insulating resin.

The following describes a method of molding the insulating resin 18. FIG. 2 is a process chart showing a resin molding process performed to mold the insulating resin 18.

The resin molding process first places and fixes the stator core 12 equipped with the stator coil 14 in a preheating apparatus 20 and subsequently performs a process of adjusting the positions of the stator terminals 16u, 16v and 16w of the stator 10 (step S100). The configuration of the preheating apparatus 20 is described below.

Figure 3:
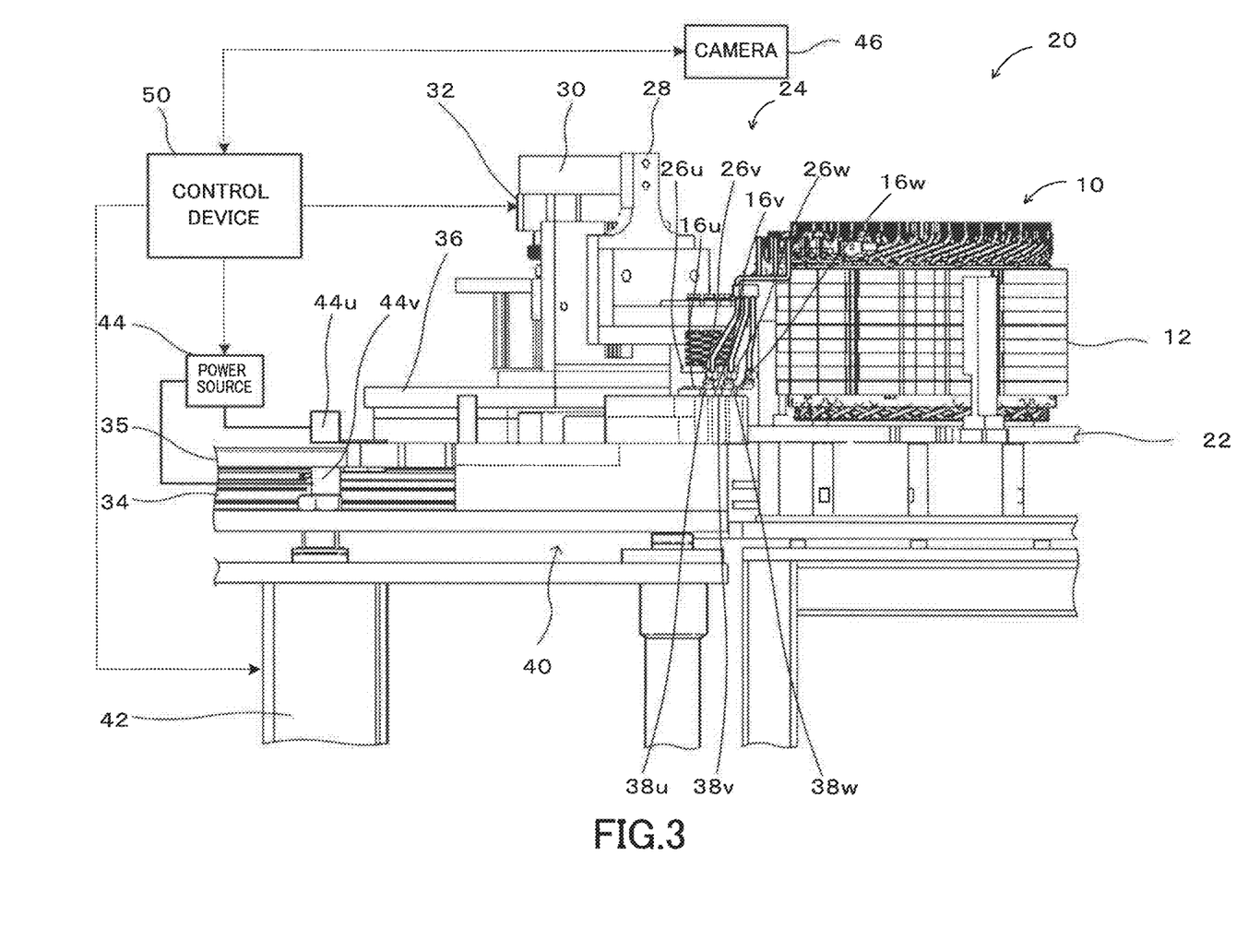
FIG. 3 is a diagram illustrating a stator core equipped with a stator coil and placed in a preheating apparatus.
Figure 4:
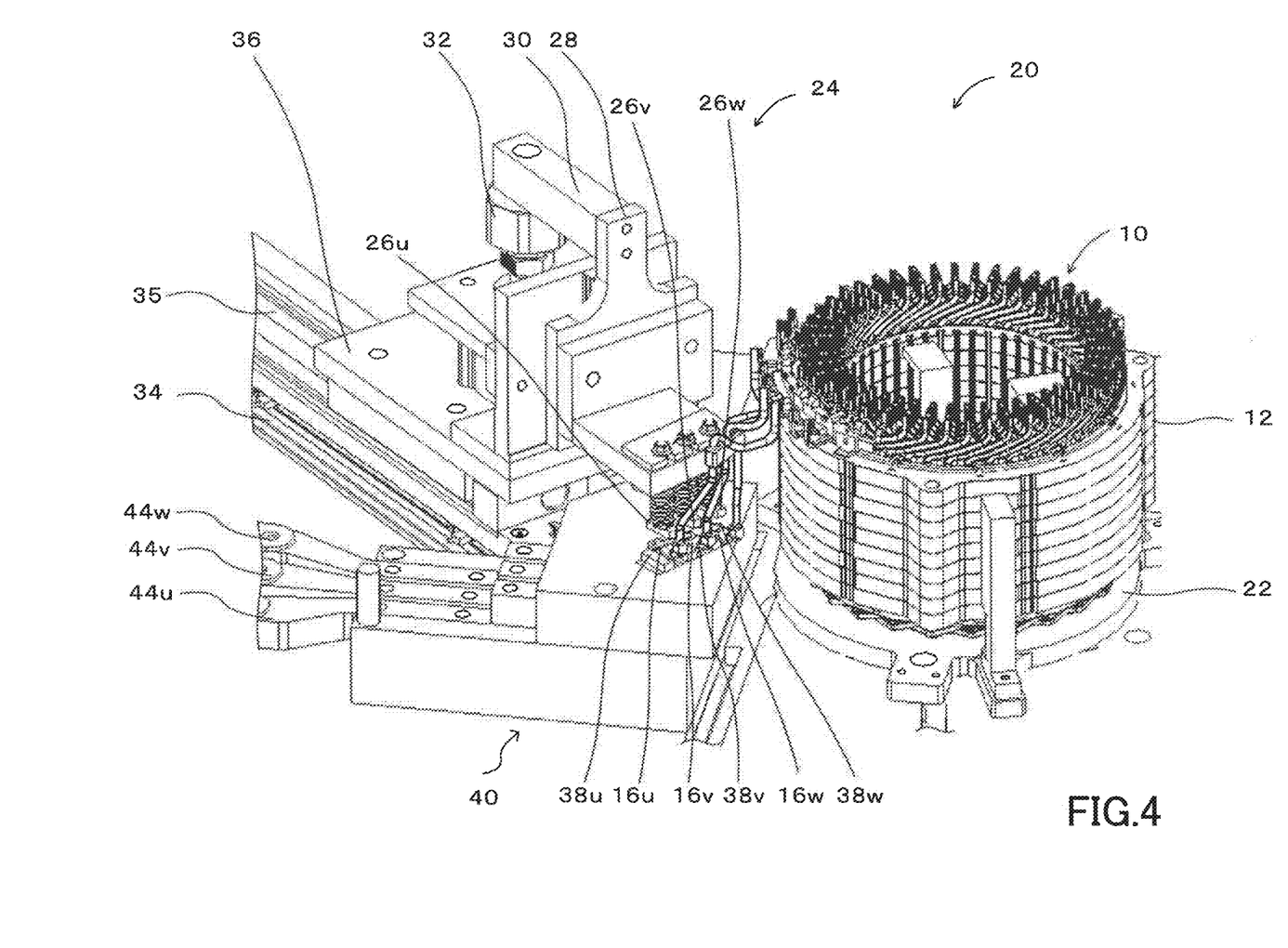
FIG. 4 is a schematic diagram schematically illustrating a main part of FIG. 3 viewed in a diagonally right downward direction in FIG. 3.
Figure 5:
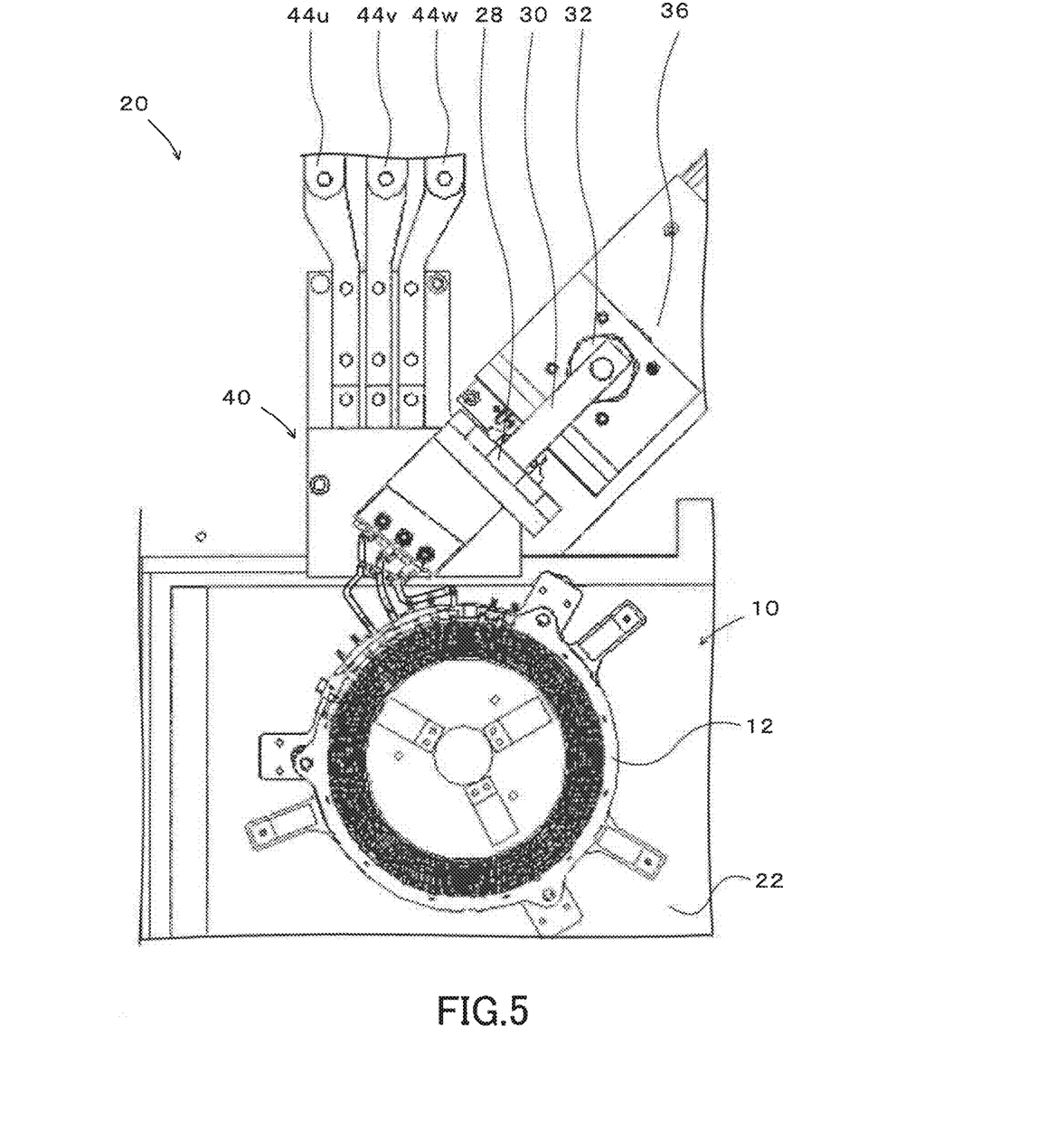
FIG. 5 is a schematic diagram schematically illustrating the main part of FIG. 3 viewed in a downward direction in FIG. 3.

FIG. 3 is a diagram illustrating the stator core 12 equipped with the stator coil 14 and placed in the preheating apparatus 20. FIG. 4 is a schematic diagram schematically illustrating a main part of FIG. 3 viewed in a diagonally right downward direction in FIG. 3. FIG. 5 is a schematic diagram schematically illustrating the main part of FIG. 3 viewed in a downward direction in FIG. 3. As illustrated, the preheating apparatus 20 includes a stage 22, a clamping device 24, a camera 46 and a control device 50.

The stator core 12 is placed and fixed on the stage 22.

The clamping device 24 includes terminal holding members 26u, 26v and 26w, a lifting cylinder 32, conducting terminal blocks 38u, 38v and 38w, and a lifting cylinder 42.

The terminal holding members 26u, 26v and. 26v are mounted to a leading end of an arm 30 via a mounting member 28. The arm 30 is cantilever supported by the lifting cylinder 32 and is moved in a vertical direction of FIG. 1 by the lifting cylinder 32.

The lifting cylinder 32 is mounted on a support table 36 that is attached to an end portion of an arm 35, which is slid along a guide rail 34 extended in a direction from an upper left side toward a lower right side in FIG. 4. The lifting cylinder 32 is controlled by the control device 50.

The conducting terminal blocks 38u, 38v and 38w are mounted on a support table 40. The support table 40 is supported by the lifting cylinder 42 and is moved in a vertical direction of FIG. 3 by the lifting cylinder 42. The conducting terminal blocks 38u, 38v and 38w are connected with a power source 44 via electrodes 44u, 44v and 44w.

The lifting cylinder 42 is controlled by the control device 50.

The camera 46 is placed at a position allowed to take images of the stator core 12 and the stator terminals 16u, 16v and 16w. The images taken by the camera 46 are output to the control device 50.

The control device 50 is configured as a CPU-based microprocessor and includes a ROM configured to store processing programs, a RAM configured to temporarily store data, input/output ports and a communication port, in addition to a CPU, although not being illustrated. The images taken by the camera 46 are input into the control device 50 via the input port. Various control signals are output from the control device 50 via the output port. The signals output from the control device 50 include, for example, driving signals to the lifting cylinders 32 and 42, a control signal to the power source 44 and a control signal to the camera 46.

In the clamping device 24 configured as described above, the arm 35 is moved in the direction from the upper left side toward the lower right side in FIG. 4 by operating a transverse cylinder (not shown) o Moving the arm 35 in this manner causes the support table 36 and the lifting cylinder 32 supported by the arm 35, the arm 30, the mounting member 28 and. the terminal holding members 26u, 26v and 26w to be moved in the direction from the upper left side toward the lower right side in FIG. 4. Operating the lifting cylinder 32 causes the arm 3 to be moved in the vertical direction in FIG. 4 and thereby causes the terminal holding members 26u, 26v and 26w to be moved in the vertical direction. Operating the lifting cylinder 42 causes the support table 40 to be moved in the vertical direction in FIG. 4 and thereby causes the conducting terminal blocks 38u, 38v and 38w to be moved the vertical direction.

Figure 6:
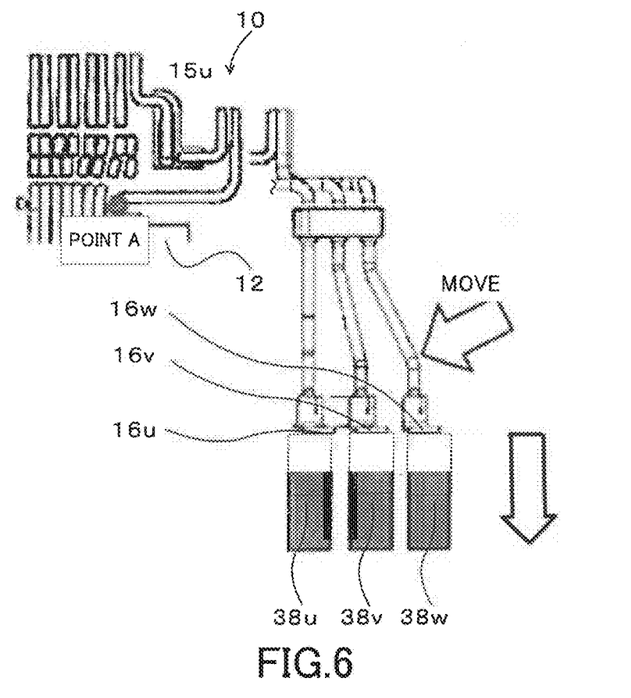
FIG. 6 is a diagram illustrating moving directions of stator terminals when conducting terminal blocks are moved downward.
Figure 7:
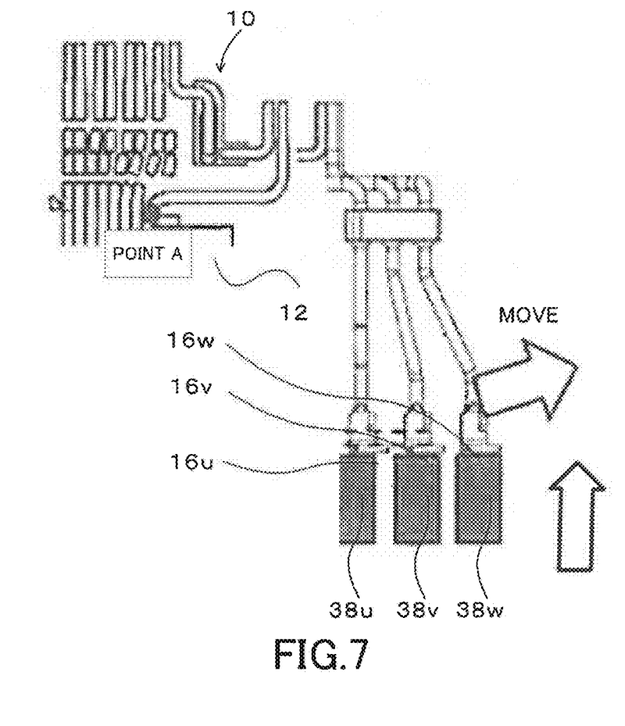
FIG. 7 is a diagram illustrating moving directions of the stator terminals when the conducting terminal blocks are moved upward.

At step S100, in the state that the terminal holding members 26u, 26v and 26w are away from the stator terminals 16u, 16v and 16w, the resin molding process operate the lifting cylinder 42 to move the conducting terminal blocks 38u, 38v and 38w either upward or downward and thereby move the stator terminals 16u, 16v and 16w. FIG. 6 is a diagram illustrating the moving directions of the stator terminals 16u, 16v and 16w when the conducting terminal blocks 38u, 38v and 38w are moved downward. FIG. 7 is a diagram illustrating the moving directions of the stator terminals 16u, 16v and 16w when the conducting terminal blocks 38u, 38v and 38w are moved upward. When the conducting terminal blocks 38u, 38v and 38w are moved downward from an abutting position where the conducting terminal blocks 38u, 38v and 38w are in contact with the stator terminals 16u, 16v and 16w (shown by the broken line in FIG. 6), the stator terminals 16u, 16v and 16w are moved inward in a radial direction of the stator core 12 about a supporting point A that is a position where an end portion of the stator coil 14 is pulled out as shown in FIG. 6. When the conducting terminal blocks 38u, 38v and 38w are moved upward, on the other hand, the stator terminals 16u, 16v and 16w are pressed up by the conducting terminal blocks 38u, 38v and 38w and are accordingly moved outward in the radial direction of the stator core 12 about the supporting point A that is the position where the end portion of the stator coil 14 is pulled out as shown in FIG. 7.

More specifically, the conducting terminal blocks 38u, 38v and 38w are moved in the following manner. The control device 50 first controls the lifting cylinder 42 such as to move the conducting terminal blocks 38u, 38v and 38w to a position where the stator terminals 16u, 16v and 16w are in contact with the conducting terminal blocks 38u, 38v and 38w (as shown in FIG. 6). An image of the center of an axis O of the stator core 12 (shown in FIG. 8) and the stator terminals 16u, 16v and 16w is then taken downward in FIG. 1 by the camera 46 in this state. The taken image is input into the control device 50.

Figure 8:
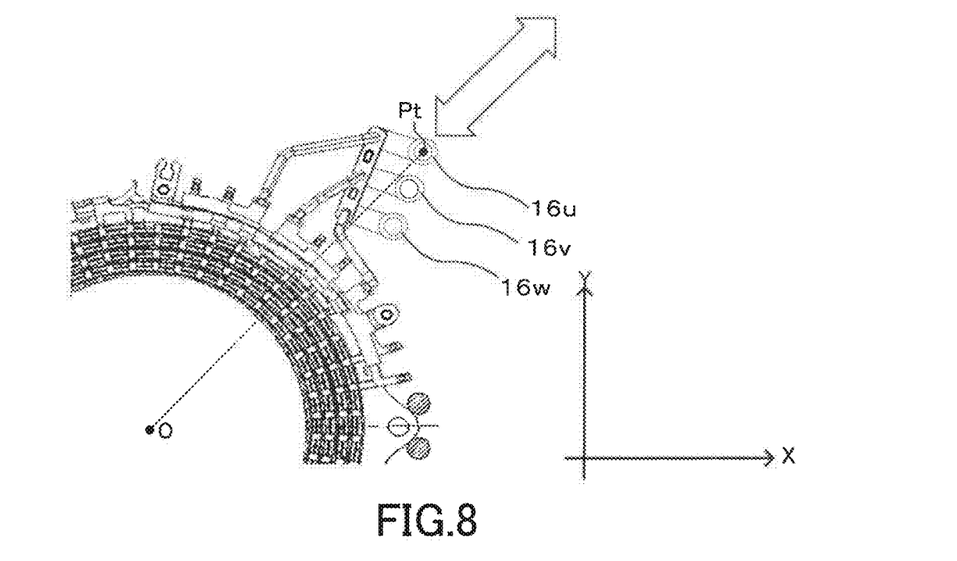
FIG. 8 is a diagram illustrating one example of a relationship between the center of an axis O and a position Pt of a stator terminal.

The control device 50 refers to the input image and determines whether a position Pt of the stator terminal 16u (for example, the position of the center of a bolt hole used to assemble the stator terminal 16u to another device by means of a bolt) relative to the center of the axis O is within a predetermined range Rp that is specified in advance as a range enabling the stator terminals 16u, 16v and 16w to be successfully assembled to another device. FIG. 8 is a diagram illustrating one example of a relationship between the center of the axis O and the position Pt of the stator terminal 16u. According to the embodiment, the moving direction of the conducting terminal block 38u (that is a direction perpendicular to the sheet surface and that takes a positive value in a direction rom the rear side of the sheet surface to the front side) is specified as a z direction, and an x direction and a y direction are specified to be parallel to the sheet surface, as illustrated.

When the position Pt of the stator terminal 16u is within the predetermined range Rp, the conducting terminal block 38u is not moved but is kept at the current position.

Figure 9:
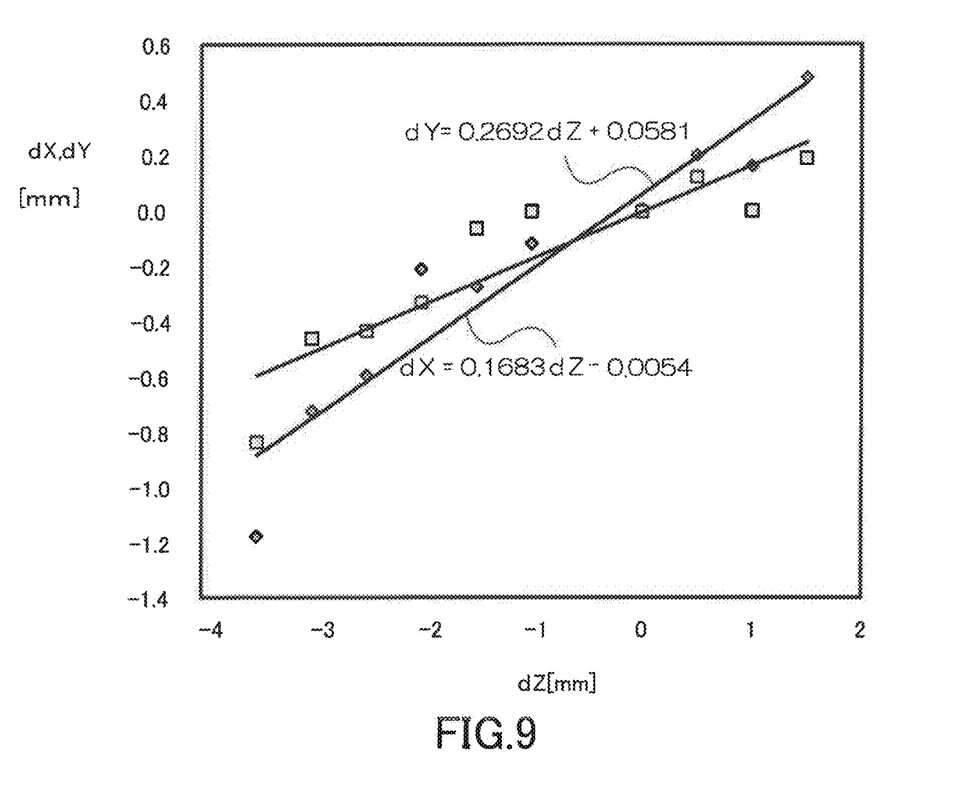
FIG. 9 is a graph illustrating one example of relationships of moving amounts dX and dY to a moving amount dZ.

When the position Pt of the stator terminal 16u is out of the predetermined range Rp, on the other hand, the control device 50 derives target moving amounts dX* and dY* of the stator terminal 16u in the X direction and in the Y direction of FIG. 8, such that the position of the stator terminal 16u becomes within the predetermined range Rp. The control device 50 subsequently derives a target moving amount dZ* of the conducting terminal block 38u relative to the stator terminal 16u in the Z direction of FIG. 8, such that the moving directions of the stator terminal 16u in the X direction and in the Y direction of FIG. 8 become equal to the target moving amounts dX* and dY* According to the embodiment, a procedure employed specifies in advance relational expressions of the moving amounts dX and dY of the stator terminal 16u in the X direction and in the Y direction of FIG. 8 to a moving amount dZ of the conducting terminal block 38u relative to the stator terminal 16u in the Z direction of FIG. 8, and derives the target moving amount dZ* such as to move the stator terminal 16u to a position within the predetermined range Rp, from these relational expressions. FIG. 9 is a graph illustrating one example of the relationships of the moving amounts dX and dY to the moving amount dZ. In the graph, closed rhombuses indicate results of an experiment with regard to the moving amount dX relative to the moving amount dZ, and closed squares indicate results of the experiment with regard to the moving amount dY relative to the moving amount dZ. Two relational expressions shown in the graph are relational expressions of the moving amounts dX and dY relative to the moving amount dZ determined from these results of the experiment by the least square method. The target moving amount dZ* is set according to these two relational expressions.

After setting the target moving amount dZ* described above, the control device 50 controls the lifting cylinder 42 to move the support table 40 either upward or downward, such that the moving amount dZ of the conducting terminal block 38u relative to the stator terminal 16u becomes equal to the target moving amount dZ*. According to the embodiment, the conducting terminal blocks 38v and 38w are moved, along with the conducting terminal block 38u. Such control causes the position of the stator terminal 16u to become within the predetermined range Rp and thereby adjusts the positions of the stator terminals 16u, 16v and 16w to the positions where the stator terminals 16u, 16v and 16w are allowed to be successfully assembled to another device.

After adjusting the positions of the stator terminals 16u, 16v and 16w as described above, the resin molding process drives the lifting cylinder 32 such as to cause the terminal holding members 26u, 26v and 26w to hold the stator terminals 16u, 16v and 16w downward in the state that the conducting terminal blocks 38u, 38v and 38w are kept at the current positions, and controls the power source 44 such as to supply electricity to the conducting terminal blocks 38u, 38v and 38w in the state that the stator terminals 16u, 16v and 16w are clamped by the terminal holding members 26u, 26v and 26w and the conducting terminal blocks 38u, 38v and 38w (step S110). This supplies electricity and heats the stator coil 14 via the stator terminals 16u, 16v and 16w to prepare for molding of the insulating resin 18 described later. According to the embodiment, as described above, the adjustment of the positions of the stator terminals 16u, 16v and 16w and the supply of electricity to the stator coil 14 are performed as a series of processes using the identical preheating apparatus 20.

After heating the stator coil 14, the resin molding process removes the stator core 12 from the preheating apparatus 20 and places the stator coil 12 in a resin molding apparatus (not shown) to mold the insulating resin 16 at the coil end 14b (step S120). The resin molding process is then terminated. A concrete procedure employed to mold the insulating resin 18 fills a mold with a thermosetting resin, soaks the coil end 14b in the resin filled in the mold, and heats to cure the thermosetting resin with an IH heater. The stator coil 14 is heated in advance at step S110, so that the resin molding process quickly raises the temperature of the thermosetting resin to mold the insulating resin 18 at step S120. As described above, the resin molding process of the embodiment molds the insulating resin 18 after performing the adjustment of the positions of the stator terminals 16u, 16v and 16w and the supply of electricity to the stator coil 14 by using the identical preheating apparatus 20 as the series of processes. This configuration suppresses an increase in the required time period from the time when the stator coil 14 is mounted to the stator core 12 to the time when the stator terminals 16u, 16v and 16w are assembled to another device, compared with a configuration of molding the insulating resin 18 to cover the stator coil 14 and subsequently placing the stator 10 in a different dedicated device to adjust the positions of the stator terminals 16u, 16v and 16w.

As described above, the resin molding method of the embodiment places the stator terminals 16u, 16v and 16w on the conducting terminal blocks 38u, 38v and 38w in such a state that clamping of the stator terminals 16u, 16v and 16w by the conducting terminal blocks 38u, 38v and 38w and the terminal holding members 26u, 26v and 26w is released. The resin molding method subsequently moves the conducting terminal blocks 38u, 38v and 38w either upward or downward, such as to cause the position of the stator terminal 16u to become within the predetermined range Rp, clamps the stator terminals 16u, 16v and 16w by the conducting terminal blocks 38u, 38v and 38w and the terminal holding members 26u, 26v and 26w in the state that the conducting terminal blocks 38u, 38v and 38w are kept at the current positions, and supplies electricity to heat the stator coil 14 via the stator terminals 16u, 16v and 16w. This suppresses an increase in the required time period from the time when the stator coil 14 is mounted to the stator core 12 to the time when the stator terminals 16u, 16v and 16w are assembled to another device.

The resin molding method of the embodiment moves the conducting terminal block 38u, such that the position Pt of the stator terminal 16u based on the taken images becomes within the predetermined range Rp at step S100. When the stator terminal 16u is clamped by the conducting terminal block 38u and the terminal holding member 26u at step S110, however, the position of the stator terminal 16u is slightly moved. A modification may thus take into account a potential move of the stator terminal 16u caused by clamping the stator terminal 16u by the conducting terminal block 38u and the terminal holding member 26u and move the conducting terminal block 38u, such that the position Pt of the stator terminal 16u becomes within the predetermined range Rp at step S100.

When the position Pt of the stator terminal 16u is out of the predetermined range Rp, the resin molding method of the embodiment moves the conducting terminal block 38u, such that the position Pt of the stator terminal 16u becomes within the predetermined range Rp. When the position of the stator terminal 16v or the stator terminal 16w, in place of the stator terminal 16u, is out of the predetermined range Rp, a modification may move the conducting terminal blocks 38u, 38v and 38w, such that the position of the stator terminal 16v or the stator terminal 16w becomes within the predetermined range Rp.

The resin molding method of the embodiment uses the camera 46 to take images of the center of the axis O of the stator core 12 and the stator terminal 16u and determines the position Pt of the stator terminal 16u by using the taken images. The technique employed to determine the position Pt of the stator terminal 16u is, however, not limited to the technique using the camera 46. Another technique, for example, a technique using a laser displacement sensor may be employed.

In the resin molding method according to the above aspect oaf the present disclosure, the first step may move the conducting terminal block either upward or downward, such that the position of the stator terminal detected by a position detector configured to detect the position of the stator terminal becomes within the predetermined range. This configuration enables the position of the stator terminal to become within the predetermined range with the higher accuracy.

In the resin molding method according to the above aspect of the present disclosure, the first step may move the conducting terminal block either upward or downward, such that the position of the stator terminal becomes within the predetermined range by using a moving amount of the stator terminal when the stator terminal is clamped by the terminal holding member and the conducting terminal block. This configuration enables the position of the stator terminal to become within the predetermined range with the higher accuracy.

The following describes a correspondence relationship between the primary elements of the above embodiment and the primary elements in the above aspects of the present disclosure described in Summary. The steps S100 and S110 in the resin molding process of the above embodiment correspond to the "first step" in the above aspect of the present disclosure. The step S120 in the resin molding process of the above embodiment corresponds to the "second step" in the above aspect of the present disclosure.

The correspondence relationship between the primary elements of the above embodiment and the primary elements in the above aspects of the present disclosure described in Summary, however, does not intend to limit the elements in the aspects of the present disclosure described in Summary, since the above embodiment is only one example for concretely describing some aspects of the present disclosure described in Summary. In other words, the aspects of the present disclosure described in Summary should be construed on the basis of the description in Summary. The embodiment is only one concrete example of the present disclosure described in Summary.

Some aspects of the present disclosure are described above with reference to the embodiment and its modifications. The present disclosure is, however, not limited to any of the embodiment and its modifications described above but may be implemented by any of various other aspects within the scope of the present disclosure.

INDUSTRIAL APPLICABILITY

The present disclosure is applicable to various manufacturing industries using the resin molding method that is performed to mold an insulating resin at a coil end of a stator coil mounted to a stator core.

What is claimed is:
1. A resin molding method of molding an insulating resin to cover a coil end of a stator coil that is mounted to a stator core, the resin molding method comprising:
   a first step of supplying electricity to and heating the stator coil via a stator terminal in a state that the stator terminal is clamped, by using a conducting terminal block configured to be electrically conducted and to be lifted up and down and provided to mount thereon the stator terminal that is connected with the stator coil and that is placed outside of the stator core, as well as a terminal holding member configured to be lifted up and down and to work in combination with the conducting terminal block to clamp the stator terminal; and
   a second step of covering the coil end of the heated stator coil with the insulating resin, while molding the insulating resin, wherein
   the first step places the stator terminal on the conducting terminal block in such a state that clamping of the stator terminal by the conducting terminal block and the terminal holding member is released, before supplying electricity to and heating the stator coil via the stator terminal in the state that the stator terminal is clamped, and moves the conducting terminal block either upward or downward, such that position of the stator terminal becomes within a predetermined range.

2. The resin molding method according to claim 1,
wherein the first step lifts up and down the conducting terminal block, such that the position of the stator terminal detected by a position detector configured to detect the position of the stator terminal becomes within the predetermined range.

3. The resin molding method according to claim 1,
wherein the first step uses a moving amount of the stator terminal when the stator terminal is clamped by the terminal holding member and the conducting terminal block, to lift up and down the conducting terminal block, such that the position of the stator terminal becomes within the predetermined range.

* * * * *